Oct. 15, 1968 R. E. BOND 3,405,897
BASE FOR SUPPORTING AN OBJECT
Filed Sept. 21, 1966 2 Sheets-Sheet 1

INVENTOR:
Robert E. Bond
By Smyth, Rooton & Pavitt
ATTORNEYS

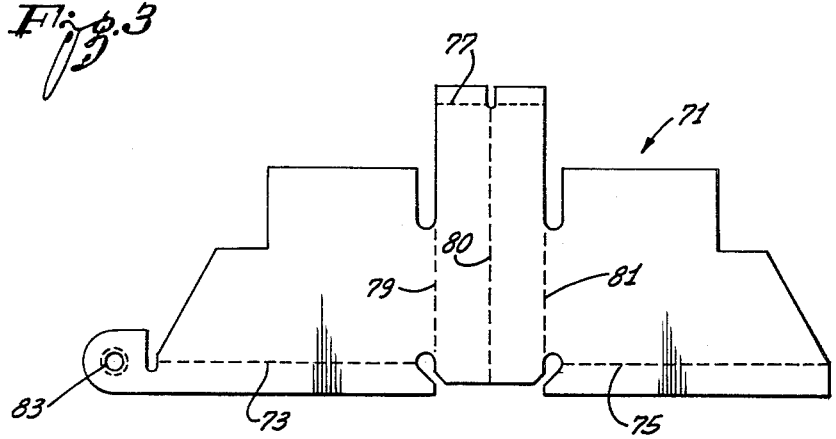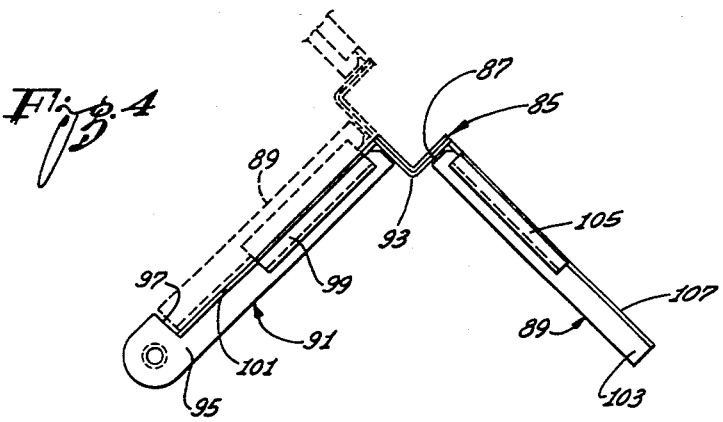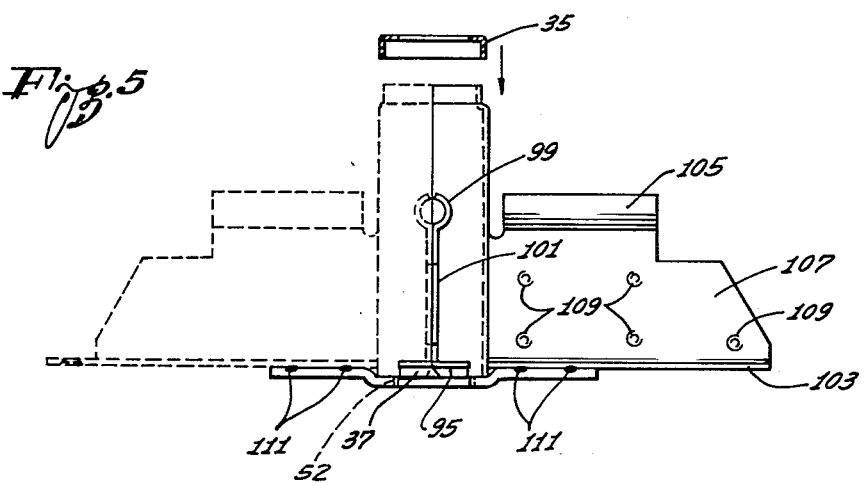

United States Patent Office 3,405,897
Patented Oct. 15, 1968

3,405,897
BASE FOR SUPPORTING AN OBJECT
Robert E. Bond, Pasadena, Calif., assignor to Selje &
Bond, South Pasadena, Calif., a partnership
Filed Sept. 21, 1966, Ser. No. 580,928
10 Claims. (Cl. 248—188.7)

ABSTRACT OF THE DISCLOSURE

This disclosure describes a device for connecting several load bearing members and including a hub assembly having a central body member and a plurality of support members extending generally radially of the central body member. A plurality of generally radially extending load bearing members are joined respectively to the support members and at least one of the load bearing members has an end surface and a slot with the slot opening at the end surface. The slot receives one of the support members.

---

This invention relates to a base for supporting an object and more particularly to an attractive base for rotatably supporting an object. Although the base of this invention is particularly adapted for swivelly supporting office chairs and signs, various other upright objects can be supported thereon.

The usual base for a revolving chair or similar item includes a hub having several radially extending legs secured thereto. The hub is adapted to support a spindle assembly for the revolving chair. Casters may be mounted on the outer extremities of the legs to allow the base and chair to be easily moved along a supporting surface.

The hub is subjected to considerable force and wear during normal use of the chair. To provide added strength and wear resistance, the hub is usually constructed of metal. The legs are preferably constructed of wood to give an attractive appearance which is compatible with the office decor.

One problem has been that the metal of the lateral peripheral surface of the hub is exposed at least in part and this detracts from the appearance of the base and the chair. The connection between the radially extending legs and the hub is also often exposed and this further detracts from the appearance of the base.

In an attempt to solve these problems, one prior art device has been provided which includes radially extending legs secured to the hub by a dovetail or similar type connection in which the groove is formed in the hub. With this arrangement the surfaces of the legs confronting the hub are spaced circumferentially by circumferentially extending sections of the lateral peripheral surface of the hub. To cover these circumferentially extending sections of the lateral peripheral surface of the hub separate sections of wood are applied thereto. The entire assembly is then bolted together between upper and lower plates. This assembly is complex, expensive and may be somewhat unsightly. Further, complex tooling is often required to form the dovetail or similar connection between the hub and the legs. Equally ineffective and impractical are prior art devices that utilize wood sheathing to cover radially extending metal leg members. In this latter type of device, the wood is not usually a load bearing element and accordingly the cost of the overall device is increased in part because of the metal legs.

According to the present invention, a strong base for supporting a chair or other upright object is provided. The base is made very attractive in that the connection between the hub and the radially extending legs is substantially completely concealed. Moreover, the lateral peripheral surface of the hub or central body member is substantially completely concealed. These advantages are obtained without the need for special tooling for forming the means for interconnecting the legs and the central body member. Thus, the components of the assembly are easily fabricated and easily assembled. The wooden legs of the present invention are load bearing elements.

The base constructed in accordance with the teachings of this invention may include a hub assembly having a central body member with a load bearing surface for supporting an object and a plurality of support members extending generally radially of the body member. The base may also include a plurality of generally radially extending legs secured respectively to the support members.

An important feature of this invention is the means for interconnecting the legs to their respective support members. Such means includes a slot in each of the legs for receiving one of the support members on the hub assembly. This forms a strong connection which is completely concealed when the base is in use.

More particularly, each of the support members may have upper and lower radially extending enlarged sections interconnected by a web section and the slot in each of the legs opens at a lower surface and an end surface thereof and is shaped to receive the web section and the upper enlarged section of the support member. The leg rests on the lower enlarged section of the support member. With this construction each of the support members is generally in the shape of an I-beam and provides excellent resistance to bending. The two enlarged sections or flanges also resist any tendency for the leg to become separated from its support member due to the usual bending moment applied to the base. To prevent the legs from being pulled radially off of their respective support members, it is desirable to utilize a fastening member such as a screw to interconnect the lower flange and the corresponding leg. The lower flange lies along the lower surface of the corresponding leg and therefore is not visible during ordinary use of the base.

The slot in each of the legs is easily formed with conventional and inexpensive tooling. For example, a circular hole may first be drilled in the leg and then a saw cut made which extends from the lower surface of the leg to the hole. In this instance it is desirable to make the upper flange a circular flange that will be snugly received in the hole portion of the slot.

Preferably, each of the support members terminates radially substantially short of its respective leg. This allows the legs to serve as load bearing elements of the base and further reduces the cost of the base.

The central body member has a lateral peripheral surface which it is desirable to conceal with wood. According to the present invention this is accomplished by interconnecting each of the legs to the hub assembly with each of the legs having end surfaces which confront and abut the lateral peripheral surface. By appropriately selecting the size and configuration of each of the end surfaces, the entire lateral peripheral surface of the central body member can be completely covered and concealed by merely assembling the legs and the hub assembly. The end surfaces of the legs are integral therewith so that no separate covering or sheathing members are required and preferably the end surfaces of the legs correspond substantially to the cross section of each of the legs. In one embodiment of this invention the central body member is generally square in plan and four of the legs are provided with each of the legs having beveled contiguous edges.

The hub assembly of this invention can be constructed in a number of different ways; however, it is preferred to construct the hub assembly of a plurality of similar bracket segments each of which includes a central portion and a pair of circumferentially spaced radially extending arms. These bracket segments are interconnected with the central portions thereof forming a central body with a passageway therein and with the radial arms of the adjacent bracket segments lying closely adjacent. Each pair of the adjacent radial arms of the adjacent bracket segments forms one of the radially extending support members. Each of the bracket segments is preferably formed of metal sheet or plate.

It is preferred to form each bracket segment from a preformed blank of sheet material. The blanks may be precut or otherwise appropriately formed. The blanks are initially flat and appropriate portions thereof are bent to form the bracket segment. The bracket segments may be interconnected by any suitable means such as spot welding.

The invention, both as to its organization and method of operation, together with further features and advantages thereof, may best be understood by reference to the following description taken in connection with the accompanying illustrative drawings, in which:

FIG. 3 is a side elevational view of a preformed blank from which one of the bracket segments is formed;

FIG. 4 is a plan view of one bracket segment with an adjacent bracket segment being partially illustrated in phantom lines; and FIG. 5 is a side elevational view of a bracket segment with an adjacent bracket segment being shown in phantom lines and also illustrating the cap and lower plate.

Figure 1:
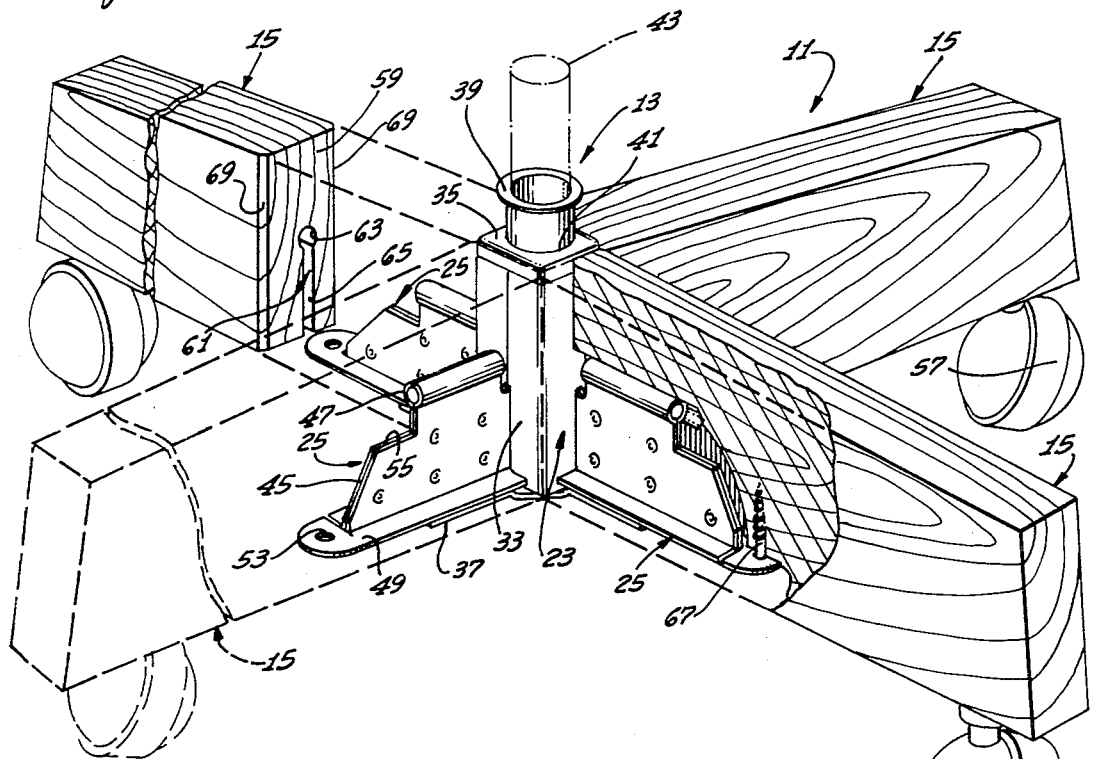
FIG. 1 is a fragmentary perspective view of a base constructed in accordance with the teachings of this invention.
Figure 2:
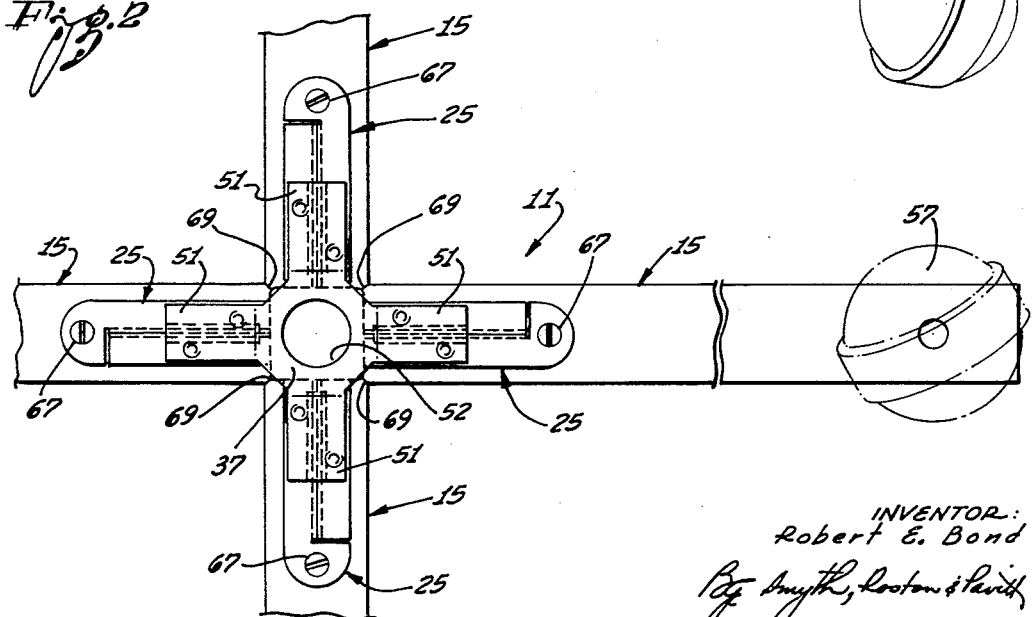
FIG. 2 is a fragmentary bottom view of the base.

Referring to the drawings and in particular to FIGS. 1 and 2 thereof, reference numeral 11 designates a base constructed in accordance with the teachings of this invention. Generally, the base includes a hub assembly 13 and four radially extending legs secured to the hub assembly.

The hub assembly 13 is preferably constructed of metal and includes a central body member 23 and four radially extending support members 25. The central body member 23 is a tubular member preferably having a generally square cross section in plan and a vertically extending longitudinal axis. The central body member 23 has a lateral peripheral surface 33 composed of four generally rectangular surfaces. A cap 35 partially closes the upper end of the body member 23 and an apertured lower plate partially closes the lower end of the body member.

A hub 39 extends through a central aperture 41 in the cap 35 and has a downwardly directed shoulder which is larger than the aperture 41 and which rests on the cap. A spindle 43 is frictionally fit within the hub 39. A chair or other upright object may in turn be supported by the spindle 43.

The support members 25 are identical and are preferably equally spaced around the body members 23 although other spacings may be used. Each support member 25 has a web section 45 which interconnects an upper flange 47 with a lower flange 49. Thus, each of the support members 25 has an I-beam cross-sectional configuration. The upper flange 47 is preferably tubular and cylindrical with the longitudinal axis of the cylinder extending radially of the body member 23 and generally perpendicular thereto. The web section 45 is preferably platelike, having substantial dimensions in both the radial and axial directions and is preferably perpendicular to the adjacent rectangular section of the peripheral surface 33. The lower flange 49 is preferably a platelike member which is generally perpendicular to the web section 45. The lower plate 37 has a plurality of radially extending tabs 51 which are suitably secured as by spot welding to the lower flanges of the support members (FIG. 2). The lower plate 37 has a hold 52 to receive a bottom shoulder of the hub 39. The lower flange 49 has a fastening aperture 53 adjacent the outer end thereof. The web section 45 may have a stepped outer edge 55 as shown in FIG. 1.

The legs 15 are identical and each of the legs is preferably constructed of an attractive wood and may have an elongated configuration as shown. A caster 57 is secured to the lower surface of each of the legs 15 adjacent the outer end thereof. Each of the legs 15 has a generally rectangular vertical cross section as shown in FIG. 1 and has an end surface 59 which is adapted to confront and engage a rectangular section of the lateral peripheral surface 33 of the body member 23. Each of the legs 15 has a slot 61 therein which opens at the end surface 59 and at the lower surface of the leg. The slot 61 has a generally cylindrical portion 63 which is sized to snugly receive the cylindrical upper flange of one of the support members 25 and a narrow slit-like portion 65 which is sized to snugly receive the web section 45 of the associated support member.

In assembling the base 11, the legs 15 are attached to the hub assembly 13 by inserting the upper flange 47 and web section 45 of one of the support members 25 into the slot 61 of an associated leg. The cylindrical portion 63 snugly receives the upper flange 47 and the slit-like portion 65 snugly receives the web section 45 of the associated support member 25. The lower surface of each of the legs 15 rests on the lower flange 49 of its associated support member 25. Screws 67 are then utilized to interconnect each of the lower flanges 49 with one of the legs 15.

With the base 11 assembled in this manner, the end surfaces 59 of the four legs 15 substantially completely cover the lateral peripheral surface 33 of the metal body member 23. Although various arrangements could be used, it is preferred to have each of the end surfaces 59 completely cover and conceal one of the rectangular sections of the lateral peripheral surface 33. To facilitate assembly of the base, each of the legs 15 preferably have inner beveled edges 69 which abut as shown in FIG. 2 when the base is assembled. It should be understood that various numbers of the legs 15 may be utilized and although the four-leg arrangement shown in the drawing is preferred, it is merely illustrative. For example, in changing the number of legs from four to three, it may also be desirable to change the shape of the body member 23 so that it is triangular in plan. This would allow each of the three legs to cover one of the three sides of the triangular body member.

The base 11 is very strong in that each of the support members 25 generally form an I-beam which offers very substantial resistance to bending. In addition, the enlarged upper flange 47 and the correspondingly shaped cylindrical portion 63 of the slot 61 resists bending forces that tend to separate the leg from the support member. The upper flange 47 and the lower flange 49 serve in effect to grip a portion of the leg 15 therebetween to further prevent separation of the leg and support member due to bending forces. The screw 67 prevents the leg from being slid radially off of the support member.

The support members 25 terminate substantially short of the outer ends of the legs 15. Thus, the legs 15 are structural load bearing elements of the base 11 and are not mere sheathing elements. Accordingly, it is not necessary to increase the cost of the base by extending the support members 25 radially the full length of the legs 15.

FIGS. 3-5 illustrate a preferred manner of constructing the hub assembly 13. Briefly, the preferred manner of construction includes forming several bracket segments from preformed blanks and interconnecting the resultant bracket segments to form the hub assembly 13. FIG. 3 shows a blank 71 which has been preformed as with a blanking die to the desired shape. The blank 71 is a flat platelike section of sheet metal having bend lines 73, 75, 77, 79, 80, and 81. The blank 71 may also have an aperture 83 preformed therein.

The blank 71 is bent with a suitable press to form a bracket segment 85 as shown in FIG. 4. The bracket segment 85 includes a central portion 87 and a pair of circumferentially spaced radially extending arms 89 and 91. The central portion 87 has a right angle bend 93 which ultimately forms one of the four corners of the body members 23. The blank 71 is bent through 90 degrees about the lines 79 and 81 so that the arms 89 and 91 are spaced by 90 degrees.

The arm 91 has a lower flange portion 95 with a generally rectangular cutout area 97 therein. The arm 91 also has a semicylindrical upper flange portion 99 interconnected to the lower flange portion 95 by a web portion 101 (FIG. 5).

The arm 89 has a radial length shorter than the radial length of the arm 91. The arm 89 has a lower flange portion 103 and an upper semicylindrical flange portion 105 which are interconnected by a web portion 107.

Four of the bracket segments 85 are interconnected with the central portions 87 thereof forming a central body having a passageway therethrough. The four central portions 87, the cap 35 and plate 37 form the central body member 23 and the passageway through the central body member. The radial arms 89 and 91 of the bracket segments 85 are interconnected and lie closely adjacent. The bracket segments are arranged so that the radial arm 89 from an adjacent bracket segment lies closely adjacent the radial arm 91 of the adjacent bracket segment as shown in FIG. 4. Thus, each pair of adjacent radial arms 89 and 91 of adjacent bracket segments 85 form a single radially extending support member 25. As the arm 89 is shorter than the arm 91, it fits snugly within the cutout area 97 of the arm 91 as shown in FIG. 4. The adjacent bracket segments 85 may be interconnected by spot welding or rivets as indicated at 109 in FIG. 5.

With the bracket segments 85 interconnected, the cap 35 may be fit over the upper ends thereof as shown in FIG. 5 and the lower plate 37 may be secured to the lower flanges of the support members by spot welds 111.

The slot 61 in the leg 15 may be formed by simply drilling the cylindrical portion 63 and then utilizing a saw to form the slit-like portion 65. Although various cross-sectional shapes may be utilized for the web section 45 and the upper flange 47, the shapes illustrated are preferred because of the ease of forming the cylindrical portion 63 by drilling and the slit-like portion 65 by sawing.

Although an exemplary embodiment of the invention has been shown and described, many changes, modifications, and substitutions may be made by one having ordinary skill in the art without necessarily departing from the spirit and scope of this invention.

What is claimed is:

1. In a base for supporting an object, the combination of:
   a hub assembly having a central body member with a load bearing surface for supporting the object and a plurality of support members extending generally radially of said body member;
   a plurality of generally radially extending legs secured respectively to said support members, at least one of said legs having a slot therein receiving one of said support members to interconnect said one leg and said one support member; and
   said one support member having upper and lower radially extending enlarged sections interconnected by a web section with at least one of said enlarged sections and at least a portion of the web section being received by said slot.

2. In a base for supporting an object, the combination of:
   a hub assembly having a central body member with a load bearing surface for supporting the object and a plurality of support members extending generally radially of said body member;
   a plurality of generally radially extending legs secured respectively to said support members, at least one of said legs having a slot therein receiving one of said support members to interconnect said one leg and said one support member; and
   said slot opening at a lower surface of said one leg and said one support member has a lower flange on which said one leg rests.

3. In a base for supporting an object, the combination of:
   a hub assembly having a central body member with a load bearing surface for supporting the object and a plurality of support members extending generally radially of said body member;
   a plurality of generally radially extending legs secured respectively to said support members, at least one of said legs having a slot therein receiving one of said support members to interconnect said one leg and said one support member;
   said one support member having upper and lower flanges interconnected by a web, said slot being sized to receive said web and said upper flange and opening at a lower surface of said one leg, said lower surface of said one leg resting on said lower flange; and
   fastening means for interconnecting said lower flange and said one leg.

4. In a hub assembly for supporting an object, the combination of:
   a plurality of similar bracket segments, each of said bracket segments including a central portion and a pair of circumferentially spaced radially extending arms;
   means for securing said bracket segments together with the central portions of said bracket segments forming a central body with a passageway therein for at least partially receiving the object and with the radial arms of the adjacent bracket segments lying closely adjacent, each pair of the adjacent radial arms of the adjacent bracket segments forming a single radially extending support member; and
   each of said pair of adjacent arms including a first arm having a notch therein and a second arm having a complementary tongue section fitting within said notch of said first arm.

5. In a connector connectible to a structural member, the combination of:
   a plurality of similar bracket segments, each of said bracket segments including a central portion and a pair of circumferentially spaced radially extending arms;
   means for securing said bracket segments together with the central portions of said bracket segments forming a central body with a passageway therein for at least partially receiving the structural member and with the radial arms of the adjacent bracket segments lying closely adjacent, each pair of the adjacent radial arms of the adjacent bracket segments forming a single radially extending support member;
   a plurality of load bearing members, each of said load bearing members having a slot for at least partially receiving said support members respectively; and
   means for securing said load bearing members to their respective support members.

6. In a connector, the combination of:
   a hub having a central body member and a plurality of support members extending generally radially of said central body member, said central body member being engageable with a structural member;
   a plurality of generally radially extending load bearing members joined respectively to said support members, at least one of said load bearing members having an end surface and a slot with the slot opening at said end surface, said slot receiving one of said support members, said one support member having a section of enlarged cross section extending along at least a portion of said slot; and fastening means for joining said one support member and said one load bearing member to prevent axial separation thereof.

7. A combination as defined in claim 6 wherein said slot is sized and shaped to snugly receive said section of enlarged cross section and said section of enlarged cross section is received in said slot.

8. A combination as defined in claim 6 wherein said slot opens at a side surface of said one load bearing member and said section of enlarged cross section is in the form of a flange facing the side surface of the load bearing member.

9. A combination as defined in claim 6 wherein said section of enlarged cross section defines a first radially extending enlarged section and said one support member also has a second generally radially extending section of enlarged cross section, said sections of enlarged cross section being interconnected by a web section with the first section and at least a portion of the web section being received by said slot.

10. A combination as defined in claim 6 wherein said central body member has a lateral peripheral surface and each of said load bearing members has an end surface with a slot therein for receiving said support members, respectively, said end surfaces confronting said lateral peripheral surface and substantially completely covering the lateral peripheral surface.

References Cited
UNITED STATES PATENTS

| | | | |
|---|---|---|---|
| 1,332,402 | 3/1920 | Krabol | 248—188.7 |
| 1,930,742 | 10/1933 | De Saussure | 108—150 |

FOREIGN PATENTS

| | | |
|---|---|---|
| 1,246,350 | 10/1960 | France. |

ROY D. FRAZIER, *Primary Examiner.*

FRANK DOMOTOR, *Assistant Examiner.*